Dec. 18, 1945.　　　G. H. WINDSOR　　　2,391,051
LITTER SUPPORTING APPARATUS
Filed Feb. 12, 1944　　　3 Sheets-Sheet 1

INVENTOR
GEORGE H. WINDSOR
BY
ATTORNEYS

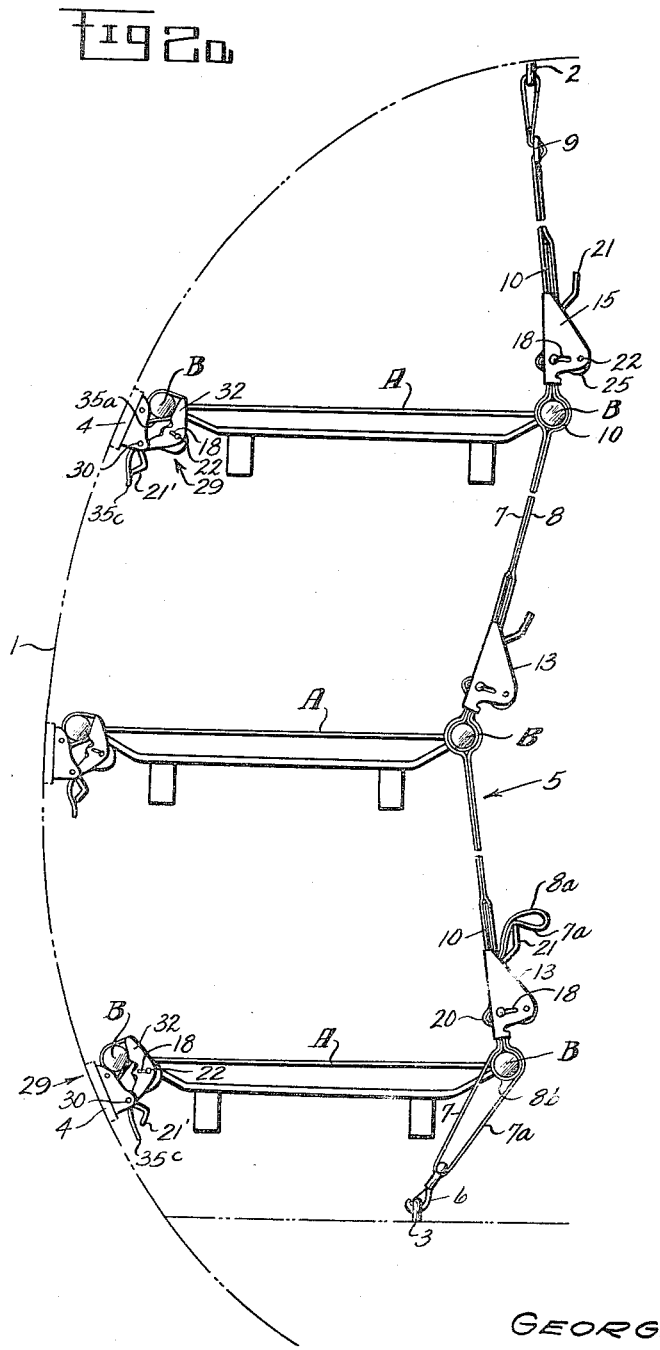

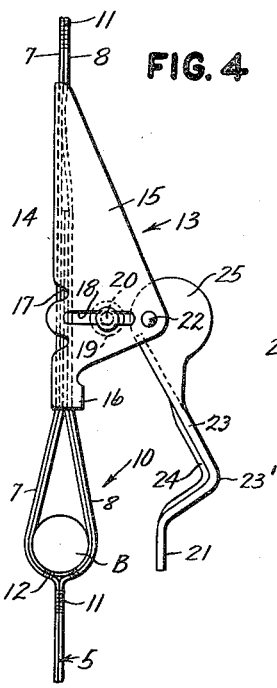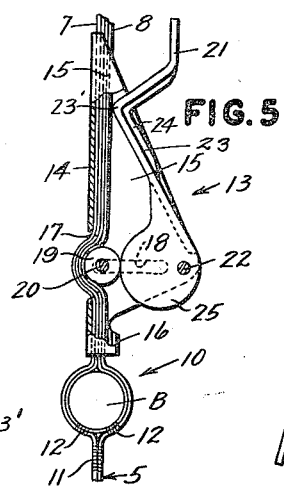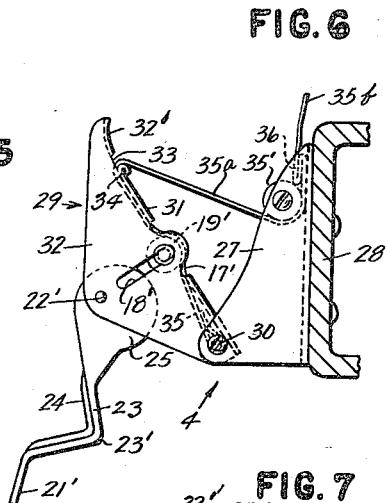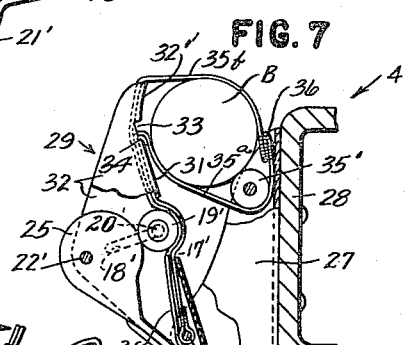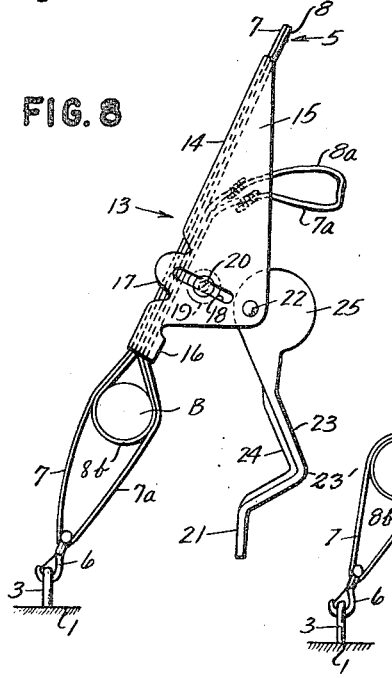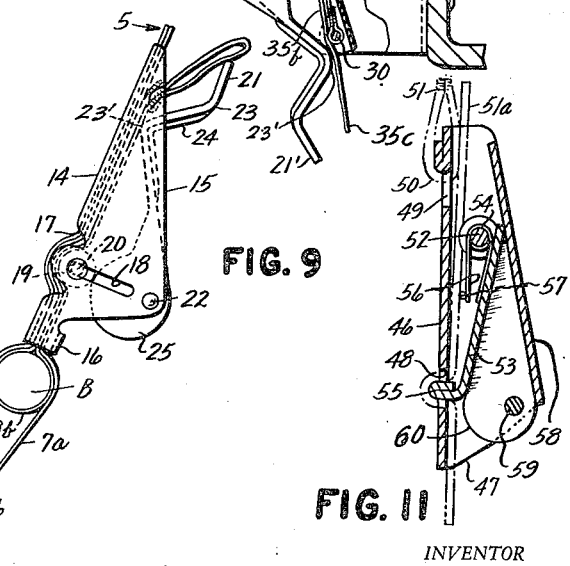
INVENTOR
GEORGE H. WINDSOR
ATTORNEYS Patented Dec. 18, 1945

2,391,051

UNITED STATES PATENT OFFICE 2,391,051

LITTER SUPPORTING APPARATUS

George H. Windsor, Tujunga, Calif.

Application February 12, 1944, Serial No. 522,179

13 Claims. (Cl. 5—9)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to detachable litter carrier supporting apparatus, and more particularly to a compact litter carrier supporting means for airplanes, vehicles and other supporting structures for quickly positioning, and firmly supporting load carrying litters in predetermined superposed relation in an airplane, vehicle, or other supporting structure.

An object of the invention is the provision of flexible lightweight litter supporting means for supporting litters or similar framelike structures in a vehicle or plane in which the securing means are interconnected with the vehicle at all times and may be conveniently and compactly stowed when not in use, and quickly and easily moved into operative litter supporting position without the possibility of loss or misplacement of any of the parts thereof, with provisions for positioning the litters on the supporting means and securing the same thereon against accidental displacement.

Another object is the provision of clamping means forming a part of the securing means for effecting a quick and convenient positioning and securing of the litter members on the supporting means, or a quick release and removal of the litter members from the supporting means.

A further object is the provision of cooperating clamping means constituting a part of the litter supporting apparatus for tensioning the flexible supporting members between their two vertically spaced connections on the vehicle for positively securing the litter members in predetermined superposed spaced relation between said vertically spaced connections.

A still further object is the provision of flexible litter supporting means for vehicles and other supporting structures including a plurality of flexible strap members, each fixedly secured at one end to a fixed point on the vehicle structure and detachably secured at its other end to the vehicle structure below the fixed point, in which the strap members are formed with vertically spaced litter supporting loops, and clamping means slidably disposed on the flexible supporting means in cooperative clamping relation to the supporting loops so that after the detachable ends of the strap members are secured to the vehicle and the litter pole ends or handles are inserted in the supporting loops, the clamping means may be moved to close the supporting loops and clamped in position on the strap members to firmly secure the litter pole members in the loops and simultaneously tension the strap members between their end connections to the vehicle.

A still further object is the provision of litter pole handle securing strap members and associated clamping means for vehicles and similar supporting structures, in which the strap and clamping means constitutes a litter pole supporting bracket member and is operable to tension the strap member around the litter pole handle member.

A further object of the invention is the provision of clamping means for flexible strap-like supporting members to positively interlock the clamping means to the strap members and simultaneously move the end portions of the strap members toward the clamping means incident to the clamping action.

Other objects and advantages of the invention will become apparent from the following description, taken in connection with the accompanying drawings, in which like reference characters refer to like parts in the several figures of the drawings.

Fig. 2a is an enlarged fragmentary detail view, somewhat diagrammatic, disclosing my improved litter supporting apparatus similar to that disclosed in Fig. 1, the outline of the supporting structure of the framework being shown in phantom.

Fig. 4 is an enlarged fragmentary side elevation of a portion of one of the litter supporting strap members, showing the same in litter pole receiving position.

Fig. 5 is a view similar to Fig. 4, parts being broken away and shown in section disclosing a litter pole handle in secured position, with the supporting member tensioned around the litter pole handle.

Fig. 6 is an enlarged detail view of one of the inboard litter pole handle supporting and clamping members, showing the clamping means in released position, conditioned to receive a litter pole handle.

Fig. 7 is a detail view similar to Fig. 6, parts being broken away and shown in section, and disclosing the litter pole handle secured in position on the bracket.

Fig. 8 is a side elevation of the lower end portion of the flexible supporting member disclosing the disconnectible end, and the means for tensioning the supporting member in released position.

Fig. 9 is a fragmentary side elevation of the lower clamping member and a portion of the supporting strap member as disclosed in Fig. 8, with the clamping lever in operative strap tensioning position.

Fig. 11 is a longitudinal sectional view taken through a modified form of clamping and tensioning member.

Figure 1:
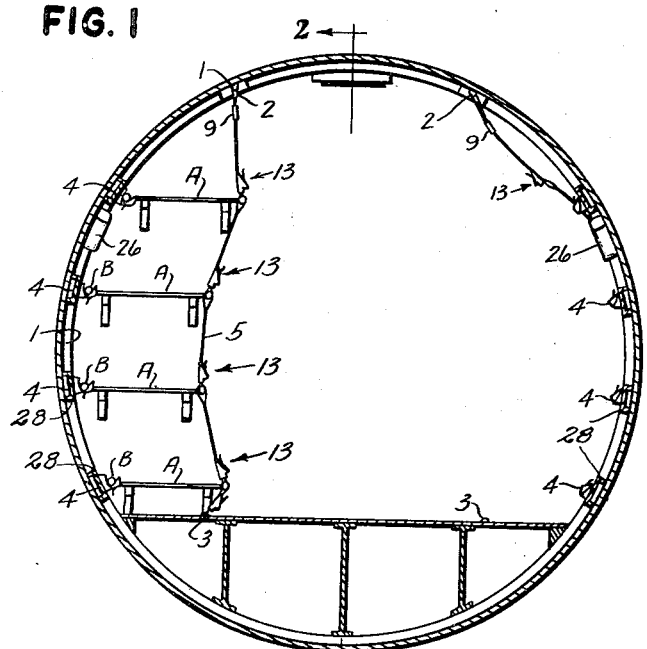
Fig. 1 is a somewhat diagrammatic cross sectional view taken through a cargo airplane having my improved litter member supporting apparatus installed therein, the litter supporting members on the left hand portion of the figure of the drawing being shown in an operative or litter supporting position, and on the right hand portion of the figure, in inoperative stored away position.
Figure 2:
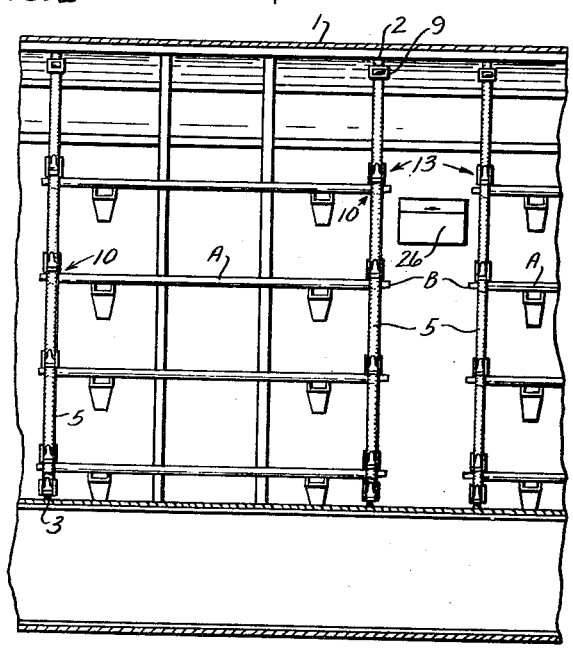
Fig. 2 is a somewhat diagrammatic vertical sectional view of the installation disclosed in Fig. 1, taken approximately on the plane indicated by the line 2—2 in Fig. 1.
Figure 3:
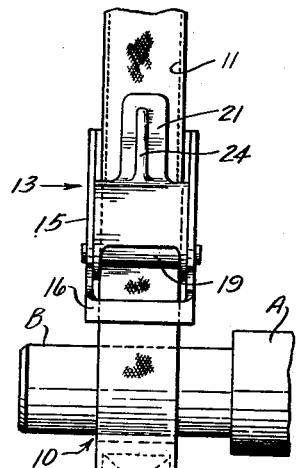
Fig. 3 is an enlarged fragmentary detail view of a portion of one of the litter supporting strap members and the litter pole securing clamping member with a litter pole handle secured in position in the strap member.

Referring more particularly to Figs. 1 and 2 of the drawings, the numeral 1 indicates a supporting structure or framework such as the fuselage of an airplane having my improved litter supporting apparatus applied thereto. The supporting framework may also be any form of rigid or semi-rigid enclosing structure such as a motor truck or vehicle body, or even a stationary enclosure such as a frame in a building.

At vertically spaced points on the supporting frame, as indicated at 2, 3 and 4, are provided securing means for fastening my improved litter supporting apparatus to the frame. The securing members 2 and 3 are preferably in the form of U-shaped brackets or eyes projecting from fixed vertically and horizontally spaced locations on the frame. The litter supporting and clamping means 4 are secured directly to the frame in vertically spaced horizontal planes at the elevations desired for the superposed litter members A, and comprise elongated bracket members, later to be described, having flexible strap members adapted to be looped around the handles or poles B of litter members A and tensioned to secure one side of the litters adjacent the frame 1.

The ends of the litter poles B at the other or opposite side of the superposed litters A are supported by elongated flexible supporting or sustaining members indicated generally at 5 fixed at their upper ends to the upper securing means 2 and detachably connected at their lower ends by snap hooks or similar devices 6, secured to the lower ends of the supporting members and adapted to be snapped into engagement with the lower securing members 3.

The flexible supporting members 5 each comprise a strap having the snap hook 6 placed thereon, and folded intermediate its ends to dispose the folded portions 7—8 of the strap in juxtaposed relation. One of the free end portions of the strap is passed through the upper handle or sustaining eye member 2, and secured to the other free end of the strap by an adjusting buckle device 9. A plurality of litter handle sustaining open, or U-shaped, flexible loop members 10 are provided, each loop member having a depending loop portion with opposite sides thereof above the loop portions secured at horizontally opposite points to the strap portions 7 and 8 intermediate the same, as best seen in Figs. 4 and 5. One end of each loop is secured to one of the strap portions of the supporting member, while the other end of each loop is secured to the other adjacent strap portion of the supporting member.

The supporting loops 10 are formed of lengths of flat flexible material similar to the strap members 7 or 8, but short, and bent intermediate their ends and positioned between the straps of the suspension members substantially opposite the side litter supporting bracket members 4 with the ends extending upwardly so that when the litter handles B at one side of the litters are secured in position in the side brackets 4, and the handles at the opposite side of the litters are placed in the loops 10 the litters will each be supported in a substantially horizontal position.

The overlapping strap portions 7—8 of the litter sustaining members 5, between the litter handle sustaining loops 10, are secured together by stitching or other suitable fastening means 11, also the lower portions of the sustaining loops 10 are secured to the strap portions 7 and 8, as indicated at 12 in the drawings.

The supporting members 5 thus each comprise juxtaposed strap members having alternate spaced secured and unsecured portions intermediate their secured ends, with litter handle sustaining loops 10 disposed between the straps in their unsecured portions for the reception and support of the handle members B of the litters A, or other similar structures.

The lower end portions of the strap members 7 and 8 above the snap hooks 6 are left unsecured to each other for a considerable length, so that the straps may be looped back on themselves, as seen in Figs. 8 and 9, to provide a loop for the snap hook 6 and a second loop 8b to receive and secure the handle of the lowermost litter in position therein. By pulling upwardly on the outer strap end 7a of the strap member 7, that portion of the strap between the upper end connection 2 and the snap hook 6 secured to the lower end connection 3 is drawn taut independently of the other strap portion or member 8. The other strap end portion 8a is also drawn taut, while maintaining a downward pressure on the litter pole handle B, when disposed in the loop portion 8b, drawing the second strap portion 8 of the litter sustaining member 5 taut.

Strap clamping and tensioning members, indicated generally at 13, are slidably disposed on the supporting members 5 above each of the litter handle receiving loops 10, the portions 7a and 8a are brought through the lower clamping and tensioning member 13, disposing this member slidably above the loop carrying the snap hook 6, and the loop 8b for the lowermost litter unit handle B; and since these clamping and tensioning members 13 are substantially all of the same general construction, only one will be specifically described.

The clamping and tensioning members 13 each comprise an elongated base plate 14 having laterally extending triangularly shaped side flanges 15—15 projecting from the opposite sides of the base plate in parallel relation. Extending between the side plates 15, across the clamping and tensioning member 13, above the base plate 14, in spaced parallel relation thereto is a retainer bar 16. The space between this bar and the adjacent surface of the base plate 14 is only slightly greater than the thickness of the strap portions 7 and 8 and the upturned ends of the loop members. The retainer bar 16 of the lowermost clamping member 13 is spaced from the base 14 to slidably receive the two strap members 7 and 8 and their returned ends 7a and 8a.

The base plate 14 of the clamping member has a strap receiving slot 17 formed therein extending across the base plate between the two side flanges 15, 15, adapted to receive the laterally crimped portion of the litter sustaining member 5 as disclosed in Figs. 5 and 9 of the drawings. The side flanges 15, 15, have parallel guide slots 18 formed therein, disposed in a plane passing through the slot 17 at right angles to the surface of the base plate 14. The portions of the side flanges 15, 15 adjacent the end of the slot 17, are extended beyond the surface of the base plate 14, and the guide slots 18 extend from points substantially in the plane of the base plate to points adjacent the apex of the triangular shaped side flanges 15, 15.

A strap deflecting member, in the form of a roller 19, is positioned between the side flanges 15, 15, having reduced end extensions 20, disposed in the guide slots 18. This roller is arranged to be cammed into the slot 17 by a camming lever 21, pivoted at 22 to the side flanges beyond the ends of the guide slots 18. The camming lever 21 comprises an angularly bent handle portion 23, reinforced at 24, having spaced eccentric camming plates 25 projecting laterally from the handle portion and disposed adjacent the inner faces of the side flanges 15, 15, of the base plate with the camming edges of the eccentric plates 25 disposed to engage the periphery of the roller 19 at its ends, effecting a rolling action on the roller as the same, and the strap portions 7 and 8 are cammed into the slot 17 in the base plate 14. The high points on the cam plate members 25 are disposed, with respect to the handle portion 23, so as to be moved past the camming contact points on the roller, when the camming lever 21 is moved to camming position, the angularly bent portion 23 constituting a stop means, retaining the free end of the lever 23 spaced from the base plate where it may be easily and conveniently grasped by the operator of the device, as best seen in Figures 5 and 9 of the drawings.

The relative width of the slot in the base plate 14, and the diameter, or width of the strap deflecting and crimping member or roller 19 are such that the spaces between the surface of the roller at opposite sides, and the edges of the slot 17, are approximately equal to the thickness of the layers of the strap being clamped, in order to obtain a positive clamping effect on the sustaining member as the lever 23 is moved to its final clamping position.

As before pointed out, the clamping members are slidably positioned on the sustaining members 5, one above each litter receiving opening between the two strap members of the sustaining members and the U-shaped loop member between the strap members. After the litter handles B are positioned in the loop portions, the clamping members are moved downwardly along the sustaining members 5 toward the loop portions, reducing the size of the loop openings to reduce the size of the loops around the handles.

After the clamping members are moved downwardly, as indicated above, the clamping levers 23 are moved from their released positions, as seen in Figs. 3 to 8, to their clamping and tensioning positions, as disclosed in Figs. 5 and 9. The periphery of the eccentric camming plates 25 engage the roller members 19, forcing the same into the slots 17 in the base plates 14, crimping the suspension members 5 and the upper portions of the loop members, effecting longitudinal movement thereof at opposite sides of the rollers toward the openings, shortening the length of the suspension members 5. The engagement of the circular camming flanges 25 with the surface of the rollers 19 tends to cause rotation of the rollers, producing a tendency to cause further relative longitudinal movement of the strap and loop portions below the clamping members, toward the clamping members.

This action, and the crimping action of the rollers 19 on the strap portions above the litter sustaining portions of the loops produces a tension in the suspension members 5 between their secured ends 2 and 3 at the frame, and a simultaneous tensioning of the strap portions 7 and 8b and the litter sustaining loop portions 10 extending around the handles B of the litters A. One side of each of the superposed litters is thus firmly suspended in superposed spaced relation with respect to the other litter members.

As the clamping levers are moved to clamping position, the off-set or angle portions 23 of the levers 21 engage the surface of the strap portions maintaining the ends of the levers spaced from the straps, so that they may be easily grasped, and when in this latter position, the high points on the eccentric cams 25 have passed beyond the cam contact surfaces of the rollers, making the devices self-locking.

It should be observed that as the camming rollers 19 are moved substantially midway into the slots 17, bending the crimped portions of the straps and loop members substantially at right angles around the edges of the slots, and the clamping of the straps between the edges of the slots and the rollers, provides a very secure retaining action on the portions of the suspension members, and the loops which encircle the litter pole handles.

Suitable flexible containers or bags 26 are secured to the frame 1, so that the sustaining members 5, when not in use, may be detached from their lower fastenings 3 and stored away in these containers 26. Since the suspension members remain connected to the frame at their upper ends, there is no tendency for any of the parts thereof becoming mislaid or lost, and when it is desired to put the apparatus into use it is only necessary to remove the sustaining members 5 from the bags 26, snap the hooks 6 onto the lower eyes 3, and the apparatus is ready for the reception of the litters A. The litter handles B are then inserted in the loops 10 and 8b, the clamping members 13 moved downwardly toward the litter handles, and the clamping levers 21 then moved to their clamping positions. Downward pressure should be applied to the lower litter handle while the end portions 7a and 8a of the straps 7 and 8 are initially drawn upwardly, after which the lever 21 on the lower clamping member is moved to the clamping position shown in Fig. 9.

The flexible litter supporting and securing devices 4, sustaining the other litter handles, opposite to the litter handles which are positioned in the sustaining members 5, each include a strap clamping and tensioning device somewhat similar in construction to the clamping devices 13, and include a U-shaped bracket plate 27, fixed to one of the longitudinal members 28 on the supporting frame 1, having a triangular shaped clamping frame 29 pivoted at 30, to the lower portion of the bracket plate 27.

This clamping frame 29 comprises a base plate 31, having triangular side plates, or flanges 32 to which a clamping lever 21' is pivoted, as indicated at 22', guide slots 18' being formed in the side flanges 32, extending from points adjacent the pivots 22' to points substantially in the plane of the base plates 31. A clamping roller 19', having end extensions 20' disposed in the guide slots 18' is provided, the roller extending between the side flanges 32, and adapted to be cammed into a slot 17', formed in the base plate. The upper end portion of the base plate 31 is curved toward the frame 1, as indicated at 32' in Fig. 6, and is provided with a cross slot 33. The lower edge of the plate adjacent the slot 33 is rolled to form a smooth sliding surface 34, for a litter handle supporting strap member 35, anchored at one end to a cross shaft forming the pivot 30 between the bracket plate 27 and the clamping frame. The strap extends along the base plate 31 between the same and the roller 19', passing out through the slot 33 and under the roller 35', then upwardly with its free end above the bracket 27. The strap is folded on itself as indicated at 36, in Fig. 6, to provide an obstruction, which will not pass between the roller and the base of the bracket 27.

This arrangement disposes the clamping member 29 in an inclined relation to the bracket 27, with the portion 35a of the strap 35 inclining downwardly toward the bracket member, the curved portion 32' of the clamping member extending upwardly above the inclined strap portion 35a.

When the apparatus is put into use the handles of the litters at one side thereof are first positioned on these inclined strap portions 35a, and are retained against lateral movement by the upstanding curved portions 32' of the clamping members. The other or opposite handles of the litters are then inserted in the loop portions 10 and 8a of the sustaining members 5. The litters will then be supported in superposed relation in the supporting structure. In order to firmly secure the litter handles resting on the strap portions 35a, the free ends 35b of the straps are looped around the litter handles and brought through the clamping members 29 over the strap portion 35 next to the base plates 31 and are drawn taut by a downward pull on the free ends 35c of the straps. Manual operation of each of the clamping levers 21' moves the rollers 19' in a similar manner to the roller 19 in Figs. 4 and 5, tensioning the strap members around the litter handles, preventing vertical or lateral movement of the handles with respect to the supporting frame 1. The suspension members 5 and the supporting members 4 firmly support the litters with respect to the framework 1 in predetermined superposed spaced relation, and their removal is very easily accomplished by simply moving the clamping levers to their release position and removing the litter handles.

Figure 10:
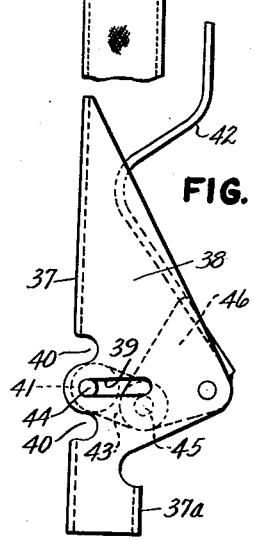
Fig. 10 is a modified form of strap tensioning clamping member.

Fig. 10 discloses a modified form of clamping and tensioning means for the suspension members 5, comprising a base plate 37 having side flanges 38 formed with guide slots 39, disposed in a plane at right angles to the base plate, passing through the strap receiving slot 40. The clamping and tensioning roller, indicated at 41, is similar to that disclosed in the other figures of the drawing, but is connected to the operating lever 42 at its ends through links 43, pivoted at 44 to the reduced ends of the rollers, and at 45 to the off-set portion 46 of the actuating lever. The base plate 37 carries a retainer bar 37a, similar to the retainer bar 16 in the first described form of clamping device.

In the operation of this form of the clamping device, the handle 42 positively moves the strap tensioning and clamping roller 41, both into and out of the clamping slot 40 and the movement of the link pivot 45 past the dead center position, with respect to the pivot 44 and the pivot of the lever 42, effects a self retaining action on the lever 42 when the same is in loop member clamping and tensioning position.

A further modification of the clamping and tensioning member is disclosed in Fig. 11. This form of the device comprises a flanged base plate 46 having upstanding side flanges 47. The base plate 46 has a strap crimping slot 48 formed therein between the side flanges 47, and a second slot 49 is formed in the base plate at one end thereof for receiving one end of one of the suspension strap members 7 or 8 comprising the suspension member 5.

A pivot rod 52 has its ends received in openings in the side flanges 47, this rod being spaced from the face of the base plate to provide sufficient clearance to receive the other end portion 51a of the other strap of the suspension member 5. A flanged strap clamping and tensioning plate 53 is pivoted at 54 on the rod 52, the free extremities of this plate 53 being bent laterally and then rebent, as indicated at 55 to form a strap deflecting tongue operable to pass midway into the slot 48 in the base plate. The relative difference between the thickness of the said laterally bent portion 55 and the longitudinal edges of the slot 48 is substantially equal to, or slightly less than the thickness of the strap members used, so that upon movement of the laterally bent portion 55 into the slot, both strap portions of the suspension member 5 at opposite sides of the laterally bent portion 55 are acutely bent around the edges of the slots, and clamped between the laterally bent portion 55 and the edges of the slot. A coil spring 56 surrounds the shaft 52, one end of the spring being secured under a pin 57 on one of the side flanges 47, and the other end of the spring disposed in engagement with the under surface of the plate 53, exerting an upward pressure on the plate tending to move the same to release position.

A manually operable flanged camming plate 58 is pivoted at 59 to the side flanges 47 of the base plate and comprises the operating means for moving the clamping plate 53 to clamping position. The side flanges of the camming plate 58 are formed with curved camming edges 60, arranged to engage the top of the clamping plate 53 just above the laterally bent end portion 55, the side flanges of this camming plate being tapered from the periphery of the camming edges 60 to a point just opposite the cross rod 52, so that the side flanges will rest on top of the clamping plate 53, with the face of the camming plate in substantially flush relation to the longitudinal edges of the side flanges 47 of the base plate 46.

This form of strap clamping and tensioning member is preferably used on the upper ends of the suspension member 5 to initially adjust the length of the suspension member.

Having thus described my invention, what I claim as new, and desire to secure by Letters Patent is:

1. In a litter supporting apparatus for structures of the class described having a supporting frame, a plurality of flexible supporting members secured to and depending from the frame at spaced points, downwardly depending litter supporting loop members secured to the supporting members intermediate the ends of the supporting members for receiving and supporting the handle members of a litter, and clamping and tensioning means slidably carried by said flexible supporting members, movable over the secured ends of the loop members, having clamping means cooperating with the loop members for securing the clamping and tensioning means on the supporting members against displacement away from the loop members and simultaneously tensioning the loop members around said litter handle members when the same are inserted in said loop members.

2. In a litter supporting apparatus for vehicles of the class described having a supporting frame, a plurality of flexible supporting members secured at their opposite ends to the frame at vertically spaced points, depending litter supporting loop members secured to the supporting members in similar vertically spaced relation from the ends of the supporting members for receiving and supporting the handle members of a litter, and clamping and tensioning means vertically slidable on said supporting members, having manually operable clamping means cooperating with said loop members and the supporting members to position the clamping and tensioning means on the supporting members and tensioning said loop members around said litter handles when inserted in said loop members and to crimp the supporting members intermediate their secured ends to simultaneously tension said supporting members between their secured ends.

3. In litter supporting apparatus for structures of the class described having a supporting frame, a plurality of flexible supporting members secured at their opposite ends to the frame at vertically spaced points, said flexible supporting members each comprising a pair of juxtaposed strap members having interconnected portions between their ends for receiving the handle members of a litter above the interconnected portions and between the strap members, clamping means slidably disposed on the said flexible supporting members above the interconnected portions and movable toward the interconnected portions and the handle members when inserted between said strap members to draw the strap members around said handle, and manually operable securing means on said clamping means operable to adjustably fix the position of the clamping means on the supporting members with respect to the said handles and to tension said strap members around the litter handle members when inserted between the said strap members.

4. In litter supporting apparatus for vehicles of the class described having a supporting frame, a plurality of flexible supporting members secured at their opposite ends to the frame at vertically spaced points, said flexible supporting members each comprising a pair of juxtaposed strap members for receiving litter handle members therebetween, depending litter handle supporting loop members having loop portions interposed between said juxtaposed strap members and secured at horizontally opposite points above the loop portions to said strap members, to receive and support the litter handle members in the loop members and between the strap members, and clamping and tensioning means carried by said flexible supporting members in vertically sliding cooperating relation with the strap members and with the loop members, having means thereon operable to clamp and tension the loop members around said litter handles when inserted in the loop members and simultaneously tension the flexible supporting members between their secured ends.

5. In a litter supporting apparatus for vehicles of the class described having a supporting frame, a plurality of flexible supporting members secured to the frame at vertically spaced points, said flexible supporting members each comprising a pair of juxtaposed strap members for receiving a litter pole handle therebetween, a litter pole handle receiving and supporting loop member interposed between said strap members having a loop portion and end portions extending therefrom secured to said strap members, and clamping and tensioning means slidably mounted on said flexible supporting member to move toward the handle receiving loop portion and operable to clamp and tension the loop portion around said litter pole handle when the same is inserted in the loop member, and to simultaneously tension the flexible supporting member between its secured ends, said clamping and tensioning means including a manually operable camming lever and clamping means operable thereby, engageable with said strap members to clamp the end portions of the loop members together between the strap members adjacent the litter pole handle when disposed in the loop portion and tension the said loop portion around the said litter pole handle.

6. In a litter supporting apparatus for vehicles of the class described having a supporting frame, a plurality of flexible supporting members secured at vertically spaced points to said frame, each comprising two juxtaposed straps secured together at spaced intervals between their ends to leave litter pole handle receiving openings therein intermediate the secured portions, litter pole handle supporting open loop members disposed between the straps in the unsecured portions with the ends of each of said loop members secured to the juxtaposed straps at points opposite each other.

7. In a litter supporting apparatus for vehicles of the class described having a supporting frame, a plurality of flexible supporting members secured at spaced points to said frame, each comprising two juxtaposed straps secured together at spaced intervals between their ends to leave litter pole handle receiving openings intermediate the secured portions, litter pole handle supporting open depending loop members interposed between the straps in their unsecured portions, with one free end of each loop member secured to each of the juxtaposed straps, and slidable clamping and tensioning means on each of the flexible supporting members operable to clamp the unsecured portions of the adjacent strap members together with the loop members therebetween to effect tensioning of each loop member around a litter pole handle when inserted in the loop member.

8. In a litter supporting structure for vehicles of the class described having a supporting frame provided with upper and lower securing points, a plurality of flexible supporting members fixedly secured to the said frame at the said upper points and depending therefrom, disconnectible means securing the lower ends of the flexible supporting members to the frame at the lower points, said flexible supporting members each comprising a pair of juxtaposed strap members secured to each other at spaced intervals to leave unsecured portions intermediate their length to receive litter pole handle members therebetween, depending open loop members having upturned free ends interposed between the unsecured portions of the strap members with each free upturned end secured to one of the strap members, clamping means slidably secured on each of the flexible supporting members above the loop members and movable downwardly thereon toward said loop members to draw the loop members around the litter pole handles when inserted in the loop members, said clamping means having strap engaging and tensioning members, and manually operable camming lever means, operable to crimp said strap and loop members intermediate their ends to tension the same with the litter pole handles disposed in the said loop members.

9. In litter supporting structures of the class described having a supporting frame, a plurality of substantially vertically disposed elongated flexible supporting members fixed at their upper ends to the supporting frame and detachably secured at their lower ends to the supporting frame, said flexible supporting members each comprising a pair of elongated straps disposed in side by side relation, depending litter pole handle supporting open loops disposed between the straps of each flexible supporting member with the ends of the said loops secured to the adjacent straps, a clamping and tensioning member slidably mounted on the straps above each loop and movable downwardly toward the loops to contract said loops and to move the straps at each side of the loops toward each other, crimping means on each of said clamping and tensioning members operable to engage and crimp a portion of said loop and said straps to shorten the effective length of the flexible supporting member between its connected ends and reduce the size of said loop, and to simultaneously tension said loop around the litter pole handle when inserted in the loop, and stop means on the straps engageable with said clamping and tensioning member, limiting the sliding movement thereof in a direction away from said loop members.

10. In a litter suport for detachably supporting the handle members of a carrying litter, a supporting frame, a pair of substantially vertically disposed parallel flexible supporting members secured at their upper ends to the frame, each flexible supporting member having an elongated litter handle receiving opening therein for receiving and supporting one of the handle portions of the opposite ends of a litter pole, a pair of substantially fixed spaced litter pole handle supporting and clamping members secured to the supporting frame in substantially the same horizontal plane as the aforesaid litter pole handle receiving openings, and opposite the said last mentioned openings, said last mentioned supporting and clamping members each comprising an elongated bracket secured to the supporting frame, an elongated clamping member pivoted at one end to the bracket for relative vertical swinging movement on said bracket, a litter pole supporting strap member anchored to the free end of the clamping member and slidably mounted in the bracket member adjacent the end thereof remote from the aforesaid pivoted end, said last mentioned clamping member having a strap receiving portion and associated clamping means for receiving the said end portion of said strap member extending from said bracket member and operable to engage the said end portion of the strap member when the same is passed around a litter pole handle, supported on said strap member between the bracket and said last mentioned clamping member, to secure and tension the strap member around the litter pole handle, and stop means on said strap member cooperating with said bracket to limit the relative sliding movement of the strap member in the last mentioned clamping member in one direction to correspondingly limit the pivotal swinging movement of the last mentioned clamping member in a direction away from said bracket member.

11. In litter supporting apparatus for supporting a plurality of litter members in spaced superposed relation, a substantially rigid supporting frame having vertically and horizontally spaced securing means thereon, a pair of horizontally spaced flexible litter supporting members depending from the upper securing means for supporting the litter poles at one side of a plurality of superposed litters, disconnectible securing means on the lower ends of said flexible supporting members for releasably securing the flexible litter supporting members to said lower securing means, said flexible supporting members each having a plurality of litter pole receiving flexible loop members secured thereto in vertically spaced relation between the ends of said flexible supporting member for receiving the ends of said litter poles, clamping means positioned on the flexible supporting members, cooperating with said loop members and said flexible supporting members, operable to tension the loop members around the litter poles when inserted in the loop members and to simultaneously tension the flexible supporting members between their connections to the securing means on the supporting frame, litter pole supporting bracket members secured to the supporting frame opposite the loop members aforesaid in similarly spaced relation to receive and support the litter poles at the other sides of the said litters, said bracket members each comprising a flexible strap member having one end secured to the supporting frame, adapted to encircle one of the last mentioned ends of the litter poles and manually operable clamping means secured to the supporting frame for receiving the end portion of the strap member including a manually operable strap tensioning and securing member movable into engagement with the last mentioned strap to tension the strap around the litter pole handle.

12. In a litter supporting apparatus of the class described, a supporting frame, a plurality of horizontally spaced flexible litter pole securing means, each comprising a flexible strap member secured to the supporting frame and adapted to encircle and support a litter pole, a clamping and tensioning device slidably disposed on said strap member, said device comprising an elongated base plate having parallel side flanges extending along the opposite sides thereof, to receive the litter pole encircling strap member therebetween, a retainer bar extending between the side flanges, and over the base plate, in spaced relation to retain the strap member between the side flanges in juxtaposed relation to the base plate, said base plate having a strap receiving and engaging opening formed therein extending between the side flanges, a laterally movable strap tensioning and deflecting member carried by said side flanges to move substantially midway into the said opening in the base plate, the relation between the width of said strap receiving and engaging opening in the base plate and the width of said strap tensioning and deflecting member being such that when the said last mentioned member is moved into the opening a portion of the strap member at each side of the opening is drawn around the edges of the opening and clamped between the opposite sides of the deflecting member and the edges of the opening, and manually operable means on the side flanges to move the deflecting member into the said opening.

13. In apparatus of the class described, a flexible supporting member comprising a pair of straps having flexible supporting loops therebetween, clamping devices slidably mounted on said flexible supporting member to slide toward and away from said flexible loops, each comprising an elongated base plate mounted on said strap, having parallel side flanges extending laterally from the opposite side edges of the base plate to receive the flexible strap member therebetween, said base plate having a narrow strap receiving opening formed therein, extending across the base plate between the side flanges to receive a portion of said strap and a portion of the loop therein, a strap tensioning and deflecting member movably carried by the side flanges to move from a position at one side of the strap member in said clamping device to a position substantially midway in the opening in the base plate to deflect a portion of the supporting member at each side of the opening through the opening, and clamp said deflected portion between the deflecting member and the opposite edges of said opening, and manually operable camming means carried by the said side flanges engageable with said deflecting member to cam the same into said opening.

GEORGE H. WINDSOR.